(12) United States Patent
Kamble et al.

(10) Patent No.: US 9,397,941 B2
(45) Date of Patent: Jul. 19, 2016

(54) DUAL PURPOSE ON-CHIP BUFFER MEMORY FOR LOW LATENCY SWITCHING

(71) Applicant: International Business Machines Corporation, Armonk, NY (US)

(72) Inventors: Keshav G. Kamble, Fremont, CA (US); Abhijit P. Kumbhare, San Jose, CA (US); Harshad S. Padhye, Santa Clara, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 14/318,483

(22) Filed: Jun. 27, 2014

(65) Prior Publication Data

US 2015/0381492 A1    Dec. 31, 2015

(51) Int. Cl.
*H04L 12/26* (2006.01)
*H04L 12/741* (2013.01)
*H04L 29/06* (2006.01)
*H04L 12/54* (2013.01)

(52) U.S. Cl.
CPC .......... *H04L 45/745* (2013.01); *H04L 12/5691* (2013.01); *H04L 69/22* (2013.01)

(58) Field of Classification Search
CPC .... H04L 45/745; H04L 12/5691; H04L 69/22
USPC .................................................. 370/229–240
See application file for complete search history.

(56) References Cited

U.S. PATENT DOCUMENTS

| | | | |
|---|---|---|---|
| 5,528,583 A * | 6/1996 | Acampora | H04L 49/3081 370/256 |
| 5,699,346 A * | 12/1997 | VanDervort | H04J 3/14 370/233 |
| 6,473,835 B2 | 10/2002 | Luick | |
| 7,581,058 B2 | 8/2009 | Takase et al. | |
| 8,018,943 B1 * | 9/2011 | Pleshek | H04L 43/028 370/254 |
| 8,478,932 B2 | 7/2013 | Baek et al. | |
| 8,483,061 B2 | 7/2013 | Lerzer et al. | |
| 2004/0133762 A1 | 7/2004 | Chao et al. | |
| 2007/0245074 A1 | 10/2007 | Rosenbluth et al. | |
| 2012/0314709 A1 | 12/2012 | Post et al. | |
| 2013/0346671 A1 | 12/2013 | Michael et al. | |

* cited by examiner

*Primary Examiner* — Mang Yeung
(74) *Attorney, Agent, or Firm* — Zilka-Kotab, PC

(57) ABSTRACT

In one embodiment, an apparatus includes a buffer memory, at least one ingress port, at least one egress port, at least one processor, and logic integrated with and/or executable by the at least one processor, the logic being configured to communicate with a software-defined network (SDN) controller, store one or more look-up tables in a first portion of the buffer memory, receive a packet using an ingress port, and determine an egress port for the packet. In another embodiment, a method for switching packets in a SDN includes storing one or more took-up tables in a first portion of a buffer memory of a SDN-capable switching device, receiving a packet using an ingress port of the switching device, and determining an egress port for the packet.

14 Claims, 6 Drawing Sheets

DUAL PURPOSE ON-CHIP BUFFER MEMORY FOR LOW LATENCY SWITCHING

BACKGROUND

The present invention relates to network switching, and more specifically, this invention relates to dual purpose on-chip buffer memory of a network switch.

Typical network switches have an on-chip buffer memory which is used to store transitory data, such as packets for ingress/egress, headers, paths, etc., which may be useful in switching data across a network.

However, typical network switches, after receiving a packet, must perform a search on a look-up table in order to determine a path with which to send a packet out. This operation may be quite resource intensive, since the look-up table may contain many thousands of entries, and the searching function can become a point of latency in the process of switching the packet.

BRIEF SUMMARY

In one embodiment, an apparatus includes a buffer memory, at least one ingress port, at least one egress port, at least one processor, and logic integrated with and/or executable by the at least one processor, the logic being configured to communicate with a software-defined network (SDN) controller, store one or more look-up tables in a first portion of the buffer memory, receive a packet using an ingress port, and determine an egress port for the packet.

In another embodiment, a computer program product for switching packets in a SDN includes a computer readable storage medium having program code embodied therewith, the program code being readable and/or executable by at least one processor to cause the at least one processor to store, by the at least one processor, one or more look-up tables in a first portion of a buffer memory of a SDN-capable switching device, receive, by the at least one processor, a packet using an ingress port of the switching device, and determine, by the at least one processor, an egress port for the packet.

In another embodiment, a method for switching packets in a SDN includes storing one or more took-up tables in a first portion of a buffer memory of a SDN-capable switching device, receiving a packet using an ingress port of the switching device, and determining an egress port for the packet.

Other aspects and embodiments of the present invention will become apparent from the flowing detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for utilizing on-chip buffer memory in a manner directed toward reducing latency for packet switching.

In one general embodiment, an apparatus includes a buffer memory, at least one ingress port, at least one egress port, at least one processor, and logic integrated with and/or executable by the at least one processor, the logic being configured to communicate with a software-defined network (SDN) controller, store one or more look-up tables in a first portion of the buffer memory, receive a packet using an ingress port, and determine an egress port for the packet.

In another general embodiment, a computer program product for switching packets in a SDN includes a computer readable storage medium having program code embodied therewith, the program code being readable and/or executable by at least one processor to cause the at least one processor to store, by the at least one processor, one or more look-up tables in a first portion of a buffer memory of a SDN-capable switching device, receive, by the at least one processor, a packet using an ingress port of the switching device, and determine, by the at least one processor, an egress port for the packet.

In another general embodiment, a method for switching packets in a SDN includes storing one or more look-up tables in a first portion of a buffer memory of a SDN-capable switching device, receiving a packet using an ingress port of the switching device, and determining an egress port for the packet.

Figure 1:
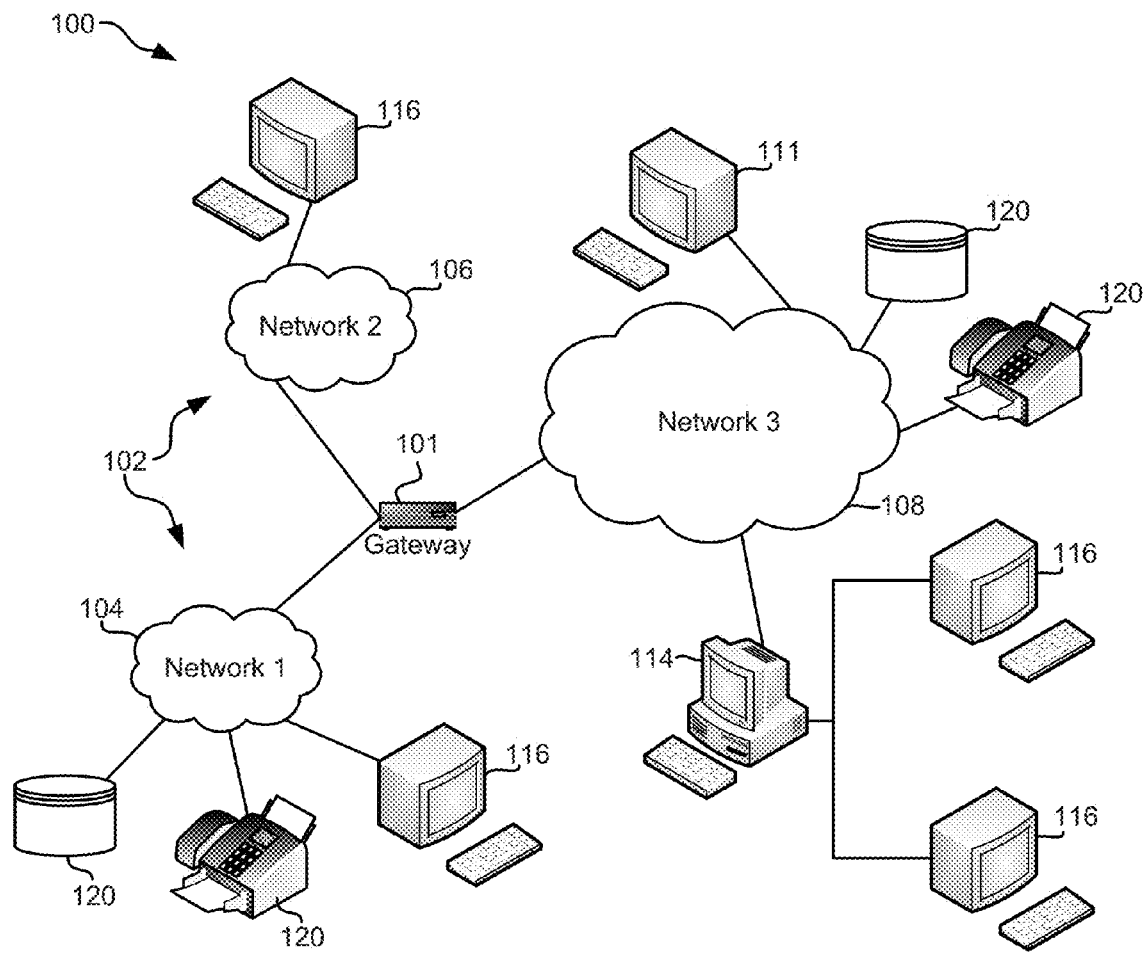
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
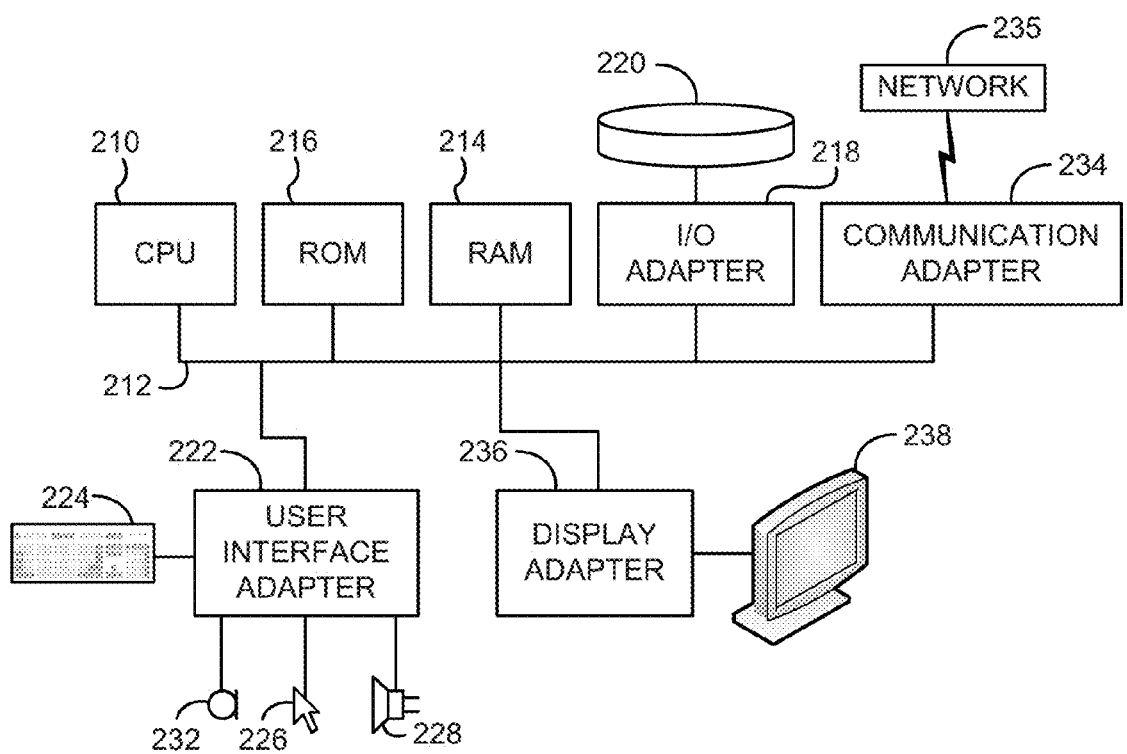
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C+ language, or other programming languages, along with an object oriented programming methodology. Object oriented programming (OOP), which has become increasingly used to develop complex applications, may be used.

Figure 3:
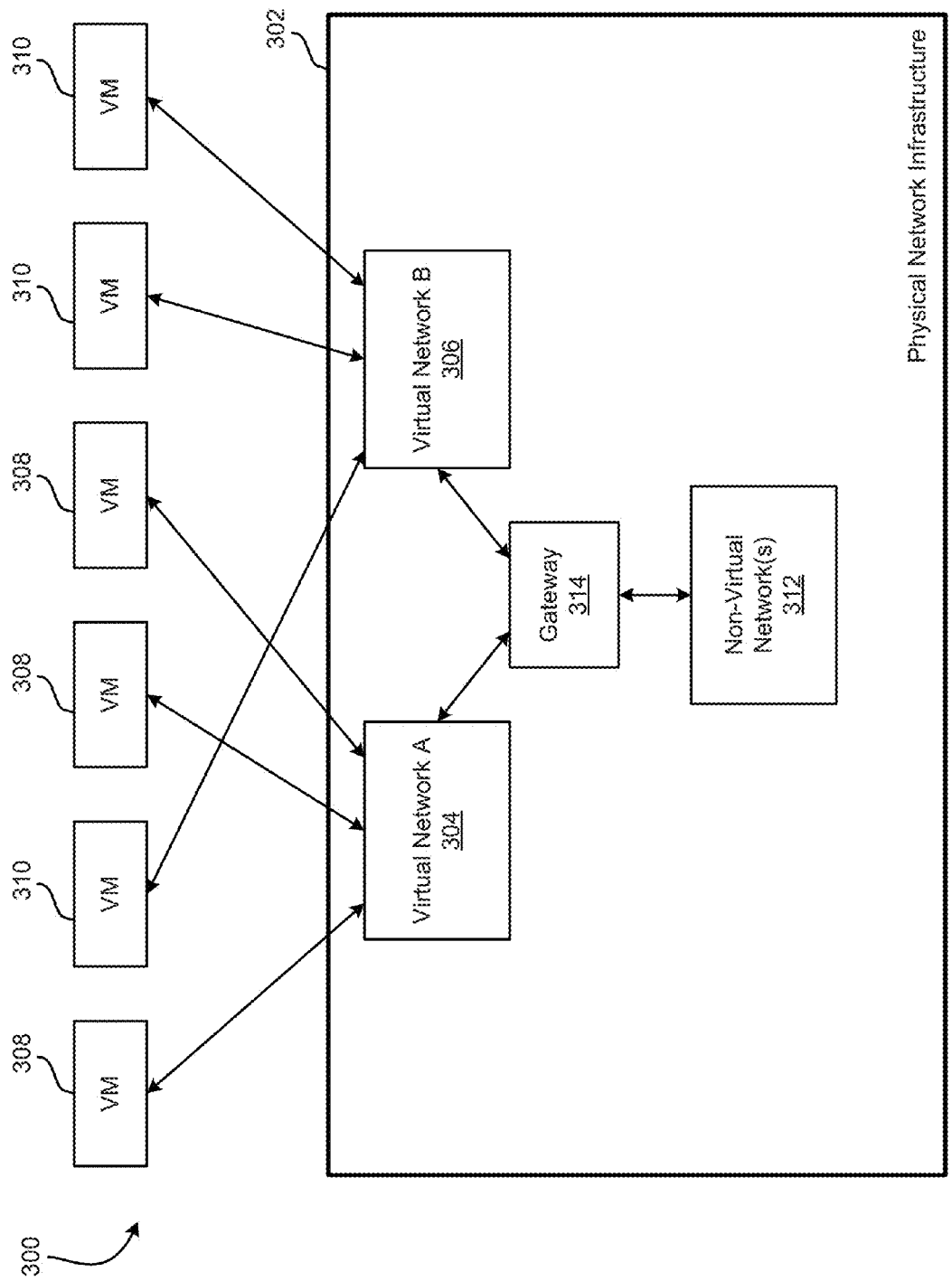
FIG. 3 is a simplified diagram of a virtualized data center, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of VMs 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

Components of an overlay network 300 typically identify where to route packets based on a virtual network identifier, referred to as a VNI or VNID. This is typically a 24-bit code or number, which excludes 0x0 and 0xFFFFF. The overlay network 300 has the capability of tunneling Layer-2 (L2) packets over the Layer-3 (L3) network by encapsulating the L2 packets into an overlay header. This may be performed using virtual extensible local area network (VXLAN) or some other overlay capable protocol, such as locator/ID separation protocol (LISP), overlay transport virtualization (OTV), Network Virtualization using Generic Routing Encapsulation (NVGRE), etc.

The packet may also be encapsulated in a user datagram protocol (UDP) and internet protocol (IP) UDP/IP header. The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, Hypervisors, switches capable of overlay functionality, etc.

In order for a device to manage a tunnel, there needs to be a mapping between an original packet's source address, destination address, and a tunnel identifier. In this way, a physical server is capable of forwarding the encapsulated original packet to the proper destination device.

Embodiments described herein are configured to utilize on-chip buffer memory more efficiently, such as for storing lookup tables to be searched by a switching processor. Embodiments presented herein are also directed toward partitioning the on-chip buffer memory for packet buffering and storing lookup tables, utilizing heuristics-based flow learning for port to port latency reduction. In another embodiment, a dual mode on-chip buffer memory is provided having one mode configured to store lookup tables and buffer packets while the other mode is configured to only buffer packets for normal switching. The mode is selectable mode via some mechanism, such as a programming register. In another embodiment, a timer-based flow expiration is provided and a trigger may be executed upon expiration of the timer to relearn some or all flow destinations. Another embodiment provides for a heuristics matrix configured to handle exception packets, along with selective cut-through routing based on some factor, such as packet size information stored in a packet's internet protocol (IP) header. More details of these embodiments are presented below, along with illustrative figures.

Figure 4:
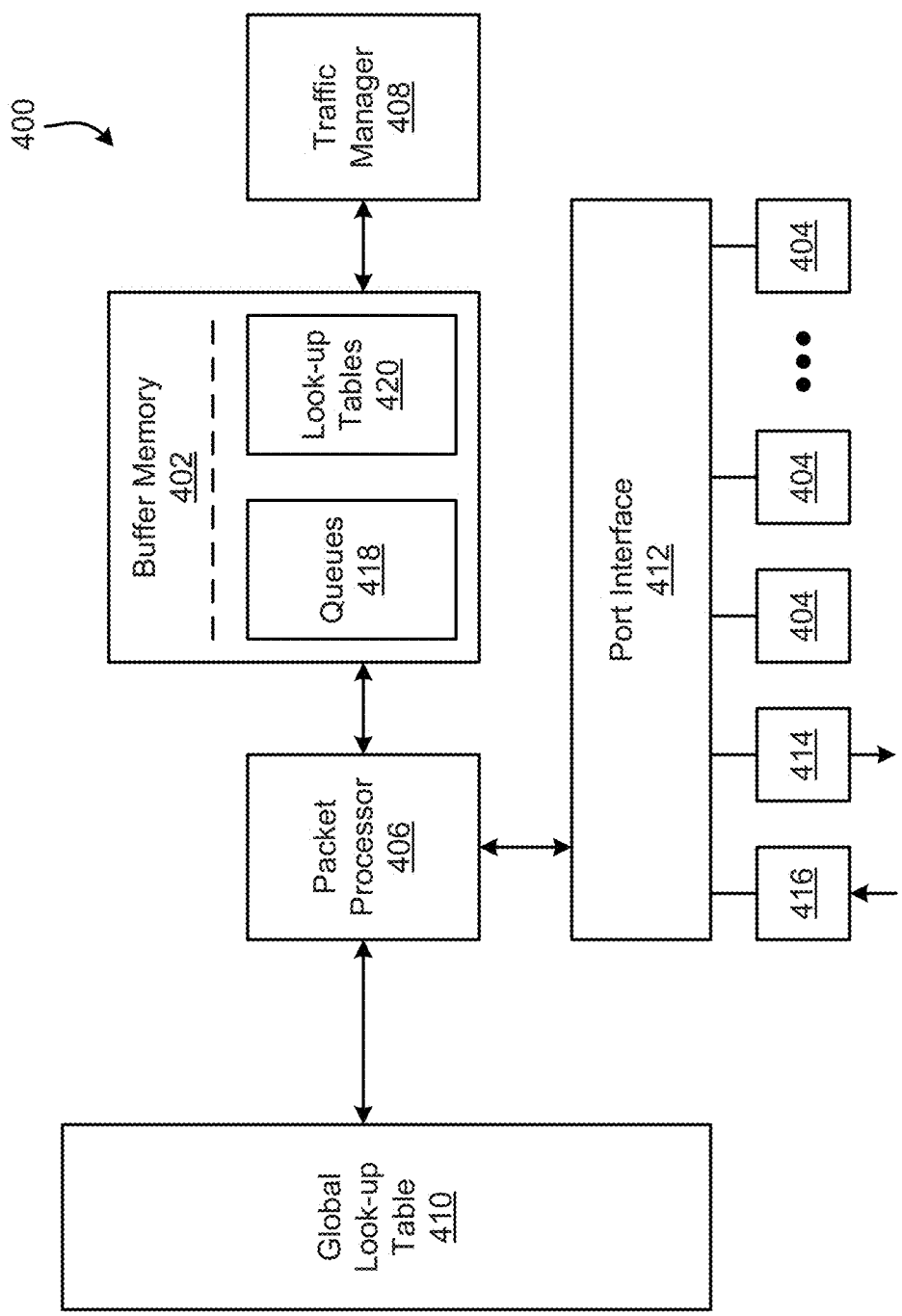
FIG. 4 shows a simplified drawing of a portion of an apparatus, according to one embodiment.

FIG. 4 shows a portion of an apparatus 400 for switching packets in a SDN according to one embodiment. The portion of the apparatus 400 that is shown in FIG. 4 may be a single microprocessor or chip, with various components included on-chip as described herein, along with others known in the art. The apparatus 400 includes a buffer memory 402 of a type known in the art, at least one ingress port 416, at least one egress port 414 (which may be the same port 404 or different ports 404), at least one packet processor 406 (such as a switching ASIC, a CPU, a combination of processors and/or processor modules, etc.), and logic integrated with and/or executable by the at least one packet processor 406.

The packet processor 406 may be configured to switch packets out of an egress port 414 and determine information about the packets, the packet processor 406 being of a type known in the art. Furthermore, in some embodiments, the packet processor 406 may be configured to start an egress timer upon receipt of the packet, the egress timer being configured to determine an amount of time that the packet is present on the apparatus 400 prior to being sent out via an egress port. In a further embodiment, the packet processor 406 may be configured to process the packet in a manner that is designed to finish processing prior to the egress timer expiring. However, in the event that the egress timer expires prior to the processing being completed, the packet is sent to the egress port and its destination immediately without further processing taking place.

Also, the apparatus 400 may include a traffic manager 408, a global look-up table 410, which may be stored to a ternary content addressable memory (TCAM) and/or some other type of memory used for storing look-up tables, as known in the art, and a port interface module 412. The port interface module 412 provides interaction between the packet processor 406 and one or more ports 404. Any of these components may be of a type known in the art and configured to perform tasks normally related with such components.

The traffic manager 408 may be configured to manage the various buffers, shifting, etc., and may be configured to send packets via an egress port 414 after major operations have been performed thereon. For example, the traffic manager 408 may send a packet after a VLAN tag is verified and/or modified during Layer-2 (L2) switching. Furthermore, the traffic manager 408 may send a packet after address resolution protocol (ARP), destination IP address, destination media access control (MAC) address, and/or the virtual local area network (VLAN) tag has been verified and/or modified during Layer-3 (L3) switching.

The logic is configured to communicate with a SDN controller (not shown), such as an OpenFlow controller in order to configure flows in the apparatus 400, store one or more look-up tables 420 (such as on a per-port basis) in a first portion of the buffer memory 402, receive a packet using an ingress port 416, and determine an egress port 414 for the packet.

In another embodiment, the logic may be further configured to partition the buffer memory 402 of a SDN-capable switching device into at least two portions, the first portion being configured to store the one or more look-up tables 420 and a second portion configured to buffer egress packets in one or more egress queues 418, each egress queue 418 corresponding to one egress port 414. Furthermore, the logic may be configured to search a look-up table 420 associated with the egress port 414 for the packet to determine additional switching information for the packet and store the additional switching information to the packet and/or a header of the packet, as would be understood by one of skill in the art.

Figure 5:
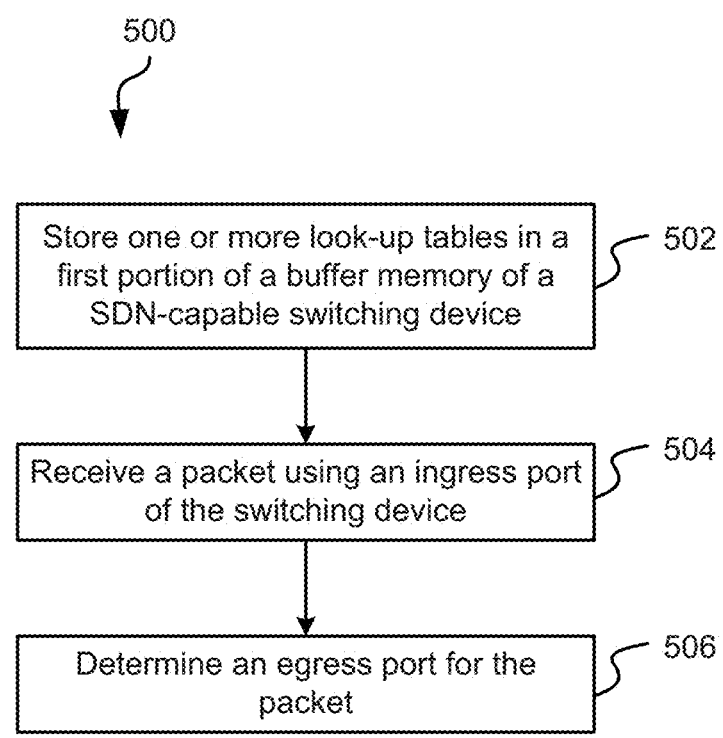
FIG. 5 shows a flowchart of a method according to one embodiment.

Furthermore, the logic may be configured to perform any of the functions described with respect to FIG. 5.

Now referring to FIG. 5, a flowchart of a method 500 for switching packets in a SDN is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a SDN-capable switching device, an OpenFlow switch, a DOVE switch, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, here one or more lookup tables are stored in a first portion of a buffer memory of a SDN-capable switching device. The look-up tables may have any format, number of columns, number of rows, size, etc., and may be based on any protocol known in the art.

In one embodiment, the look-up tables may be a ternary content addressable memory (TCAM) configured to allow for any searches thereon to be performed in a single clock cycle, as would be understood by one of skill in the art (e.g., it is a high-speed memory that is rapidly searchable). According to another embodiment, the look-up tables may include some form of algorithmic look-up tables of a type known in the art. In other embodiments, other types of buffer memory may be used to store the look-up tables, as would be known to one of skill in the art.

Each look-up table may be associated with one of a plurality of egress ports on the switching device. In this way, once an egress port is determined for a packet, the packet may be moved to a queue for that egress port and a look-up table specific to that egress port may be searched for additional packet switching information, such as VLAN identification (ID) information (e.g., a VLAN tag), a source MAC address, a destination MAC address, a source IP address, a destination IP address, etc. Once the additional packet switching information is determined, the additional packet switching information may be stored in a header of the packet at appropriate locations therein, and/or in the packet itself. Then, in one embodiment, the packet may be switched out via the selected egress port to its destination. In another embodiment, the packet may be switched out via the selected egress port to its destination prior to all of the additional switching information being determined and/or stored to the packet. This may be performed when the packet is running out of time to be switched to its destination (e.g., a timer that was begun when the packet arrived has almost expired), and the additional switching information is deemed to be less important than getting the packet switched out to its destination, a decision which may be made based on rule application, heuristics, or user settings.

According to one embodiment, each look-up table may co-exist in an on-chip buffer memory with queues associated to egress ports, it may hold a limited number of flows as per heuristics and/or static flows between ports, it has an interface to the packet processor, and it is a shallow table configured for fast look-up performance.

According to another embodiment, the buffer queues may co-exist in an on-chip buffer memory with look-up tables on a per-port basis, they ma be dedicated to one egress port, they may hold a fixed amount of buffering per port, they each have an interface to the traffic manager, and they are each limited in size to keep latency low. In a further embodiment, the queues may be tuned for cut-through operation in some circumstances.

What is meant by SDN-capable is that the switching device, e.g., a switch, etc., is configured to communicate with a SDN controller via any SDN communication protocol known in the art, such as OpenFlow, etc. In one embodiment, the SDN controller may be an OpenFlow controller, and the switching device may be configured to communicate with the OpenFlow controller via OpenFlow-compliant messages.

In operation 504, a packet is received using an ingress port of the switching device. Any of the at least one ingress ports may be used to receive the packet. Furthermore, the packet may be any type of communication packet known in the art, such as a control packet to be provided to the CPU of the switching device for control plane instructions/requests, an IP packet, an Ethernet packet, etc.

In operation 506, an egress port for the packet is determined. Any technique known in the art may be used to determine the egress port, such as reading a header of the packet, correlating characteristics of the packet with an appropriate egress port, heuristically learning which port is associated with packets having one or more characteristics in common with the currently received packet, etc.

According to one embodiment, the method 500 may further include heuristically determining packet flows to create port-to-port mappings between ingress ports and egress ports of the switching device, and storing the port-to-port mappings in the one or more look-up tables. Heuristically determining packet flows includes learning, based on packets received and switched out, characteristics of packets indicate that a packet will be switched out on a particular egress port, to a great certainty, as would be understood by one of skill in the art.

The look-up tables may be configured as a binary search tree (BST) on a per-egress port basis, such that each port has its own associated look-up table. In this way, the operations used to determine additional switching information for the packet are reduced as much as possible. In one embodiment, the look-up tables may utilize tuples to determine a one-to-one relationship between packets having certain characteristics and an egress port with which to switch out the packet having those certain characteristics.

In various embodiments, the tuples may include any combination of source MAC address (SMAC), destination MAC address (DMAC), destination port (DPORT), source port (SPORT), source IP address (SIP), destination IP address (DIP), EtherType, source VLAN (SVLAN), destination VLAN (DVLAN), etc., such as <SMAC, DMAC>, <DMAC, DPORT>, <SIP, DMAC>, <SVLAN, SIP, DPORT>, <SMAC, EtherType, DMAC>, <SMAC, Ether Type, DIP, DVLAN>, among others. In this way, once the tuple is resolved, other additional switching information for the packet may be determined based on the tuple and one-to-one relationship, as long as other packet characteristics match up.

In a further embodiment, heuristically determining the packet flows to create the port-to-port mappings may include, over some predetermined time period (such as 100 milliseconds, 1 second, 5 seconds, 10 seconds, 1 minute, etc.), receiving a plurality of packets to switch, determining an ingress port of each of the plurality of packets, determining an egress port for each of the plurality of packets, and determining patterns associated with characteristics of one or more of the plurality of packets. Each pattern includes a consistent ingress port for each of the one or more of the plurality of packets and a consistent egress port for each of the one or more of the plurality of packets, such that a one-to-one relationship between ingress port and egress port may be established. Then, packets which are received on one of the associated ingress ports that fit the other packet characteristics may be atomically switched out on the associated egress port.

The heuristic learning may rely on a matrix that may be created that relates packets received and switched (or dropped) with all other pertinent packet characteristics in order to determine, with a high degree of certainty and precision, where a packet is supposed to be switched (its egress port) without performing numerous slower operations to look-up such information. The matrix may include many thousands of heuristically learned routing paths and relationships between certain packet characteristics and associated egress ports. In order to preserve limited buffer memory space, only a subset of all such paths and relationships may be stored in the look-up tables for the individual egress ports. In this way, any packet that is received which does not adhere to one of the paths and relationships may be switched using conventional switching operations, such as by passing the packet to the CPU for processing, using a normal look-up table outside of the buffer memory, etc.

In one such embodiment, method 500 may include creating a heuristics matrix based on switching a plurality of packets through the switching device. The heuristics matrix may be configured to determine which exception packets to pass through to an egress port and which to drop, and exception packets may then be handled using the heuristics matrix. In this way, not all exception packets need be passed through to the CPU, such as when the heuristics matrix identifies the packet as one which should be dropped. Furthermore, some packets may satisfy criteria for cut-through processing, where the packet is not passed through to the CPU for control plane processing, but instead is handled via some heuristically learned routing path.

In another embodiment, a timer may be set upon creating one of the port-to-port mappings and at least one of the port-to-port mapping may be expired upon expiration of the timer. It may be the port-to-port mapping which was created to initiate the timer, or some other port-to-port mapping. Furthermore, the at least one port-to-port mapping, upon expiration of the timer, is relearned according to this approach. In this way, the various port-to-port mappings are maintained as relevant, and stale or out-of-date port-to-port mappings do not remain in the buffer memory taking up space which could be better used for other purposes.

In another embodiment, method 500 may include starting an egress timer upon receipt of the packet, the egress timer being configured to determine an amount of time that the packet is present on the switching device prior to being sent out via an egress port. In a further embodiment, method 500 may include processing the packet (using any processing techniques known in the art) in a manner that is designed to finish processing prior to the egress timer expiring. However, in the event that the egress timer expires prior to the processing being completed, the packet is sent to the egress port and its destination immediately without further processing taking place.

According to another embodiment, the method 500 may include partitioning the buffer memory of the SDN-capable switching device into at least two portions, the first portion being configured to store the one or more look-up tables and a second portion configured to buffer egress packets in one or more egress queues, each egress queue corresponding to one egress port. In this way, while the look-up table associated with the egress port is searched to retrieve and/or determine additional switching information for the packet, the packet may already be in queue waiting its turn to be switched out from the switching device. As the additional switching information is determined for the packet, it may be stored to the packet and/or a header of the packet, as would be known to one of skill in the art.

Depending on the amount of time that the packet has been processing at the switching device, the packet may be switched out via the egress port without the additional switching information being added to the packet, and/or with only some of the additional switching information being added to the packet. Either after the additional switching information is added to the packet or it is determined that the packet has been resident in the switching device for a maximum amount of time, the packet is switched out via the egress port.

In another embodiment, the heuristics matrix, along with the heuristically determined port-to-port mappings, may be used to provide a circuit switching-like functionality for fast packet switching in the SDN-capable switching device for certain packets which adhere to flows specified in the various look-up tables associated with a particular egress port.

In yet another embodiment, method 500 may include receiving a packet at an ingress port of the switching device, determining a packet size from information in a header of the packet, and, when the packet size is greater than a predetermined and/or heuristically learned threshold, beginning to route the packet via the egress port once the egress port is determined. In this way, the packet may be queued to be transmitted prior to all the additional switching information being determined, and may even begin being sent out the egress port before all of the packet or the whole packet is received at the ingress port.

Figure 6:
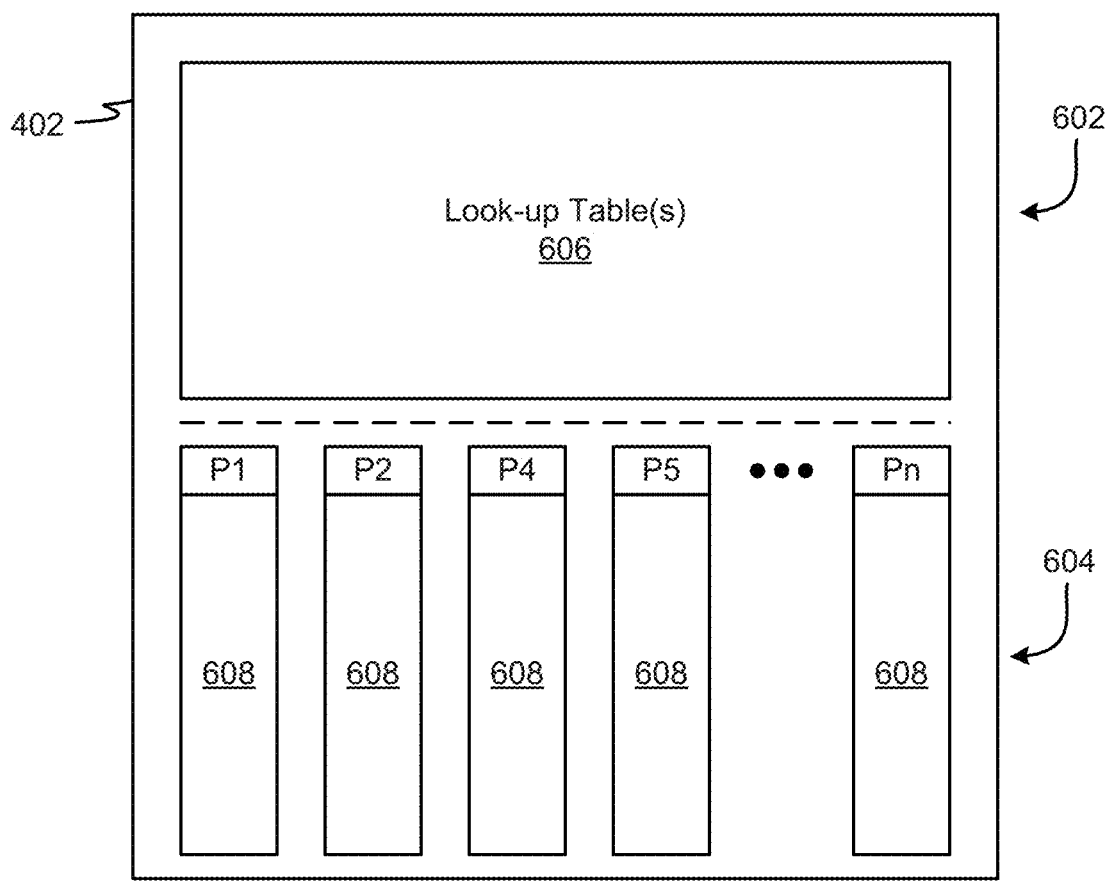
FIG. 6 shows a simplified drawing of a buffer memory, according to one embodiment.

Now referring to FIG. 6, a schematic diagram of a buffer memory 402 is shown according to one embodiment. As shown, the buffer memory 402 is partitioned into a first portion 602 and a second portion 604. The first portion 602 is configured to store one or more look-up table(s) 606 on a per-port basis, so that when an egress port for a packet is determined, the shallow look-up table(s) 606 associated with that egress port may be used to determine additional switching information for the packet. The second portion 604 is configured to buffer egress packets in queues 608, with one queue 608 being present for each port (P1, P2, . . . , Pn) that has been set up in a port-to-port mapping in the heuristics matrix. Not all ports may have a queue 608 in the buffer memory 402, because not all ports have a flow associated therewith that has convergence.

Of course, other ways of partitioning the buffer memory 402 may be used, as would be apparent to one of skill in the art. Furthermore, the buffer memory 402 may be selectively partitioned so that in some instances, it may only be used for buffering egress packets in queues 608, while in other instances, it may be partitioned into at least two portions for buffering egress packets in queues 608 and look-up table(s) 606 storage and searching.

In one embodiment, the buffer memory 402 may only be partitioned when there is at least one port-to-port mapping that has been heuristically learned with a sufficient level of confidence (convergence) to dictate that packets will always be forwarded as predicted by the port mapping. Then, the buffer memory 402 may be partitioned to take advantage of the reduced latency associated with forwarding packets using the buffer memory 402 for look-up table 606 searching and packet buffering in queues 608 on a per-port basis.

According to one embodiment, the look-up tables 606 may co-exist in an on-chip buffer memory 402 with per-port queues 608 associated to egress ports, it may hold a limited number of flows as per heuristics and/or static flows between ports, it has an interface to the packet processor, and it is a shallow table configured for fast look-up performance.

According to another embodiment, the buffer queues 608 may co-exist in an on-chip buffer memory 402 with look-up table(s) 606 on a per-port basis, they may be dedicated to one egress port, they may hold a fixed amount of buffering per port, they each have an interface to the traffic manager, and they are each limited in size to keep latency low. In a further embodiment, the queues 608 may be tuned for cut-through operation in some circumstances.

The present invention my be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
 a buffer memory;
 at least one ingress port;
 at least one egress port;
 at least one processor; and
 logic integrated with and/or executable by the at least one processor; the logic being configured to:
  communicate with a software-defined network (SDN) controller;
  store one or more look-up tables in a first portion of the buffer memory;
  receive a packet using an ingress port;
  determine an egress port for the packet;
  heuristically determine packet flows to create port-to-port mappings between the at least one ingress port and the at least one egress port;
  store the port-to-port mappings in the one or more look-up tables;

set a timer upon creating one of the port-to-port mappings;

retire at least one of the port-to-port mappings upon expiration of the timer; and relearn the at least one of the port-to-port mappings.

2. The apparatus as recited in claim 1, wherein the logic configured to heuristically determine the packet flows to create the port-to-port mappings is further configured to:

receive a plurality of packets to switch over a predetermined period of time;

determine an ingress port associated with each of the plurality of packets;

determine an egress port associated with each of the plurality of packets; and determine patterns associated with characteristics of one or more of the plurality of packets, each pattern comprising a consistent ingress port for each of the one or more of the plurality of packets and a consistent egress port for each of the one or more of the plurality of packets.

3. The apparatus as recited in claim 1, wherein the logic is further configured to:

partition the buffer memory into at least two portions, the first portion of the at least two portions configured to store the one or more look-up tables, each look-up table corresponding to one egress port, and a second portion of the at least two portions configured to buffer egress packets in one or more egress queues, each egress queue corresponding to one egress port;

search a look-up table associated with the egress port for the packet to determine additional switching information for the packet; and store the additional switching information to the packet and/or a header of the packet.

4. The apparatus as recited in claim 1, wherein the logic is further configured to:

create a heuristics matrix based on switching a plurality of packets through the apparatus, the heuristics matrix being configured to determine which exception packets to pass through to an egress port and which to drop; and handle exception packets using the heuristics matrix.

5. The apparatus as recited in claim 1, wherein the logic is further configured to:

start an egress timer upon receipt of the packet;

process the packet in order to finish processing prior to the egress timer expiring;

determine a packet size from information in a header of the packet when packet size information is available in the header;

begin to route the packet via the egress port once the egress port is determined; and send the packet to the egress port upon expiration of the egress timer without further processing.

6. A computer program product for switching packets in a software-defined network (SDN), the computer program product comprising a computer readable storage medium having program code embodied therewith, the program code being readable and/or executable by at least one processor to cause the at least one processor to:

store, by the at least one processor, one or more look-up tables in a first portion of a buffer memory of a SDN-capable switching device;

receive, by the at least one processor, a packet using an ingress port of the switching device;

determine, by the at least one processor, an egress port for the packet;

heuristically determine, by the at least one processor, packet flows to create port-to-port mappings between ingress ports and egress ports of the switching device;

store, by the at least one processor, the port-to-port mappings in the one or more look-up tables;

set, by the at least one processor, a timer upon creating one of the port-to-port mappings;

retire, by the at least one processor, at least one of the port-to-port mappings upon expiration of the timer; and relearn, by the at least one processor, the at least one of the port-to-port mappings.

7. The computer program product as recited in claim 6, wherein the program code configured to cause the at least one processor to heuristically determine the packet flows to create the port-to-port mappings is further readable and/or executable by the at least one processor to:

receive, by the at least one processor, a plurality of packets to switch over a predetermined period of time;

determine, by the at least one processor, an ingress port of each of the plurality of packets;

determine, by the at least one processor, an egress port for each of the plurality of packets; and determine, by the at least one processor, patterns associated with characteristics of one or more of the plurality of packets, each pattern comprising a consistent ingress port for each of the one or more of the plurality of packets and a consistent egress port for each of the one or more of the plurality of packets.

8. The computer program product as recited in claim 6, wherein the program code is further readable and/or executable by the at least one processor to:

partition, by the at least one processor, the buffer memory of a SDN-capable switching device into at least two portions, the first portion of the at least two portions configured to store the one or more look-up tables, each look-up table corresponding to one egress port, and a second portion of the at least two portions configured to buffer egress packets in one or more egress queues, each egress queue corresponding to one egress port;

search, by the at least one processor, a look-up table associated with the egress port for the packet to determine additional switching information for the packet; and store, by the at least one processor, the additional switching information to the packet and/or a header of the packet.

9. The computer program product as recited in claim 6, wherein the program code is further readable and/or executable by the at least one processor to:

create, by the at least one processor, a heuristics matrix based on switching a plurality of packets through the switching device, the heuristics matrix being configured to determine which exception packets to pass through to an egress port and which to drop; and handle, by the at least one processor, exception packets using the heuristics matrix.

10. The computer program product as recited in claim 6, wherein the program code is further readable and/or executable by the at least one processor to:

start, by the at least one processor, an egress timer upon receipt of the packet;

process, by the at least one processor, the packet in order to finish processing prior to the egress timer expiring;

determine, by the at least one processor, a packet size from information in a header of the packet when packet size information is available in the header;

begin to route, by the at least one processor, the packet via the egress port once the egress port is determined; and send, by the at least one processor, the packet to the egress port upon expiration of the egress timer without further processing.

11. A method for switching packets in a software-defined network (SDN), the method comprising:
   storing one or more look-up tables in a first portion of a buffer memory of a SDN-capable switching device;
   receiving a packet using an ingress port of the switching device;
   determining an egress port for the packet;
   heuristically determining packet flows to create port-to-port mappings between ingress ports and egress ports of the switching device;
   storing the port-to-port mappings in the one or more look-up tables;
   setting a timer upon creating one of the port-to-port mappings;
   retiring at least one of the port-to-port mappings upon expiration of the timer; and
   relearning the at least one of the port-to-port mappings.

12. The method as recited in claim 11, wherein the heuristically determining the packet flows to create the port-to-port mappings comprises:
   receiving a plurality of packets to switch over a predetermined period of time;
   determining an ingress port of each of the plurality of packets;
   determining an egress port for each of the plurality of packets; and
   determining patterns associated with characteristics of one or more of the plurality of packets, each pattern comprising a consistent ingress port for each of the one or more of the plurality of packets and a consistent egress port for each of the one or more of the plurality of packets.

13. The method as recited in claim 11, further comprising:
   partitioning the buffer memory of the SDN-capable switching device into at least two portions, the first portion of the at least two portions being configured to store the one or more look-up tables, each look-up table corresponding to one egress port, and a second portion of the at least two portions being configured to buffer egress packets in one or more egress queues, each egress queue corresponding to one egress port;
   searching a look-up table associated with the egress port for the packet to determine additional switching information for the packet; and
   storing the additional switching information to the packet and/or a header of the packet.

14. The method as recited in claim 11, further comprising:
   creating a heuristics matrix based on switching a plurality of packets through the switching device, the heuristics matrix being configured to determine which exception packets to pass through to an egress port and which to drop;
   handling exception packets using the heuristics matrix;
   determining a packet size from information in a header of the packet; and
   beginning to route the packet via the egress port once the egress port is determined.

* * * * *